United States Patent [19]

Dozsa

[11] 3,793,841

[45] Feb. 26, 1974

[54] METHOD OF MAKING AND USING SOIL STABILIZER

[75] Inventor: Otto L. Dozsa, Palos Heights, Ill.

[73] Assignee: United States Gypsum Company, Chicago, Ill.

[22] Filed: Jan. 25, 1971

[21] Appl. No.: 109,410

[52] U.S. Cl. ............ 61/36 R, 49/9, 106/118, 106/286, 106/287 SS, 264/117, 264/118
[51] Int. Cl. ........ B01j 2/00, C04b 1/00, E02d 3/12
[58] Field of Search 106/286, 287 SS, 118; 61/36 R; 166/292; 264/117, 118; 47/9

[56] References Cited

UNITED STATES PATENTS

| | | | |
|---|---|---|---|
| 2,163,860 | 6/1939 | White | 47/9 |
| 2,877,599 | 3/1959 | Hebestreet et al. | 47/9 |
| 3,131,074 | 4/1964 | Thompson | 106/63 |
| 2,815,294 | 12/1957 | Havelin et al. | 106/118 |
| 2,902,346 | 9/1959 | Volk | 106/118 |
| 2,956,867 | 10/1960 | Volk et al. | 106/118 |
| 3,526,172 | 9/1970 | Stuart | 106/287 SS |

FOREIGN PATENTS OR APPLICATIONS

| | | | |
|---|---|---|---|
| 1,250,375 | 11/1960 | France | 106/287 SS |

*Primary Examiner*—Allan Lieberman
*Attorney, Agent, or Firm*—Kenneth E. Roberts, Esq.; Stanton T. Hadley, Esq.; Dana M. Schmidt, Esq.

[57] ABSTRACT

An agglomerate of CaO and Ca(OH)$_2$ the thickness of which does not exceed about 0.2 inches, characterized by the ability to disintegrate in the presence of water into particles sufficiently small as to stabilize soil. The agglomerate is produced by continuously compacting at room temperature a mixture of the two components wherein the amount of CaO is between 40 and 60 percent of the total weight.

7 Claims, 2 Drawing Figures

Otto L. Dozsa
INVENTOR.

BY Dana M. Schmidt
George E. Verhage
John Kenneth Wise ATTORNEYS

METHOD OF MAKING AND USING SOIL STABILIZER

BACKGROUND OF THE INVENTION

A necessary step in most modern civil engineering projects is the stabilization of the soil upon which the project is to be built. Conventionally, soil stabilization involves the treatment of the soil to change its water content, consistency, plasticity, and/or load-bearing strength. A common material which is added to clay-type soil to accomplish this is hydrated lime [Ca(OH)$_2$]. The lime is preferably spread by blowing it from pneumatic trucks, as the lime is not sufficiently flowable to be spread by other types of mechanical systems. Individual bags can be used to distribute the lime, but as these must be individually opened and spread by hand, such a distribution is not as efficient as the use of pneumatic trucks.

Lime blown from pneumatic trucks develops dusting which undesirably pollutes the atmosphere. Particularly this is true in outdoor construction projects such as highways. In some cases, the dusting has been so severe as to require a complete halt in the spreading of the lime. Quicklime (CaO) has been proposed as an alternative to the dust-producing hydrated lime, but the caustic nature of that material has created its own handline problems. Still other attempted alternatives have been the use of a water slurry of hydrated lime, and the addition of at least three additives to the soil. The former has the disadvantage of requiring considerable equipment the expense of which makes only the largest construction jobs suitable for the system. The latter, of which U.S. Pat. No. 3,131,074 is an example, is by its complexity a very expensive alternative to the use of hydrated lime.

Agglomeration techniques have been proposed heretofore for the solution of dust problems. However, hydrated lime by its fluffy nature is very difficult to agglomerate without using batch-process presses which use vacuum to deaerate the voids of the fine material. An example of such a pressing-under-vacuum technique is disclosed in U.S. Pat. No. 2,334,499. Even if the hydrated lime could be agglomerated, soil stabilization requires sizes which are smaller than those producible by the dust-less agglomeration. In other words, the soil stabilization requires small particles sizes less than 30 mesh screen generally, which in turn have caused dusting when the stabilizing agent is Ca(OH)$_2$.

SUMMARY OF THE INVENTION

The disclosure relates to a method, and the product resulting therefrom, or agglomerating hydrated lime without the use of heat or vacuum. Further, there is provided a dust-less method of stabilizing soil by the spreading and subsequent disintegration of the agglomerate product.

All of this has been rendered possible by the discovery that, under certain conditions, hydrated lime can be agglomerated so as to form dust-less sizes which will, upon proper treatment, disintegrate to a smaller size, which conveniently is that which is necessary to stabilize the soil. More specifically, there is provided improved soil-stabilizing agglomerates each of which contains Ca(OH)$_2$ and CaO, the agglomerates having a thickness no greater than about 0.25 inches. The agglomerates stabilize soil in a pollution-free process which comprises the steps of depositing the agglomerates on soil, disintegrating the agglomerates, and mixing the latter and the soil together.

The agglomerates are produced by a process which comprises the steps of continuously mixing and compressing particles of CaO and Ca(OH)$_2$ under pressure at room temperature so as to form compacted bodies, and reducing the thickness of the bodies to an amount which does not exceed about 0.25 inches.

Accordingly, it is an object of the invention to provide a dust-less soil stabilizer which can be spread without polluting the atmosphere and without requiring special handling techniques such as are characteristic of caustic materials.

It is a further object of the invention to provide such a stabilizer which is by its simplicity, inexpensive to make.

It is yet another object of the invention to provide such a stabilizer which is self-reducing in size merely by the addition of water.

It is a related object of the invention to provide an inexpensive, continuous method of making such a stabilizer.

Other objects and advantages will become apparent upon reference to the following drawings and detailed discussion.

DESCRIPTION OF THE PREFERRED EMBODIMENTS

The invention concerns a water disintegratable agglomerate of hydrated lime which is particularly suited for use as a dust-less soil stabilizer. Several discoveries led to the development of the invention, one of which was that hydrated lime [Ca(OH)$_2$] could be continuously agglomerated under pressure at room temperature without the use of vacuum if it is first mixed with a sufficient amount of quicklime (CaO). It was further discovered that, if the dust-less agglomerate is formed with a thickness not exceeding about 0.25 inches, it will self-disintegrate merely upon the addition of water, into particles which conveniently are the size necessary to stabilize soil, namely particles which will pass through a 30 mesh screen. As used in this application, all mesh numbers are U.S. standard mesh.

Figure 1:
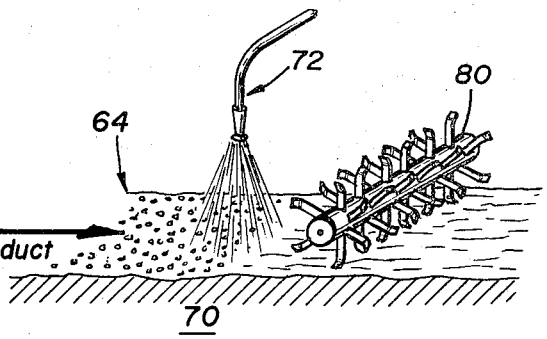
FIG. 1 is a schematic illustration of the processes of the invention.

Turning now to FIG. 1, there is illustrated in a schematic fashion both the process of making the agglomerate and one of the uses to which the product may be put. The product itself is more clearly, and again schematically, illustrated in FIG. 2 as it moves through the manufacturing process. The machinery depicted in FIG. 1 is conventional and illustrative only, there being a wide variety of apparatus which can perform the steps of the process.

MANUFACTURING PROCESS AND PRODUCT

Thus, the manufacturing process is a continuous process comprising the steps of mixing particles of CaO and Ca(OH)$_2$, compacting the mixture, breaking and granulating the resultant compacted sheet, and sizing the bodies produced by the breaking and granulating steps. The quicklime should be commercial grade pulverized quicklime 10 having a reactivity such that the ratio of total temperature rise in °C to the total active slaking time in minutes as specified by ASTM C-110-69, is at least 4. This quicklime and commercial grade hydrated lime 12 can be fed from hoppers 20 and 22, respectively, into a suitable mixer 24. The sizes of the lime and quicklime are preferably such that individually they will pass through a 30 mesh screen. In addition, the majority of the quicklime input should pass through a 50 mesh screen. How much of the quicklime which must have this fineness depends upon its reactivity and the percentage of quicklime in the agglomerate. The greater the reactivity and the greater the percentage of quicklime in the agglomerate, the coarser it may be in the input. For example, one type of low reactive 40 percent quicklime mixture must have at least 95 percent of the quicklime input pass through a 50 mesh screen, while a more reactive 60 percent quicklime mixture can be made with a quicklime of which about 85 percent passes through the 50 mesh screen. The impurities existing in the input materials have not been found to affect the compacting or the stabilizing processes.

Figure 2:
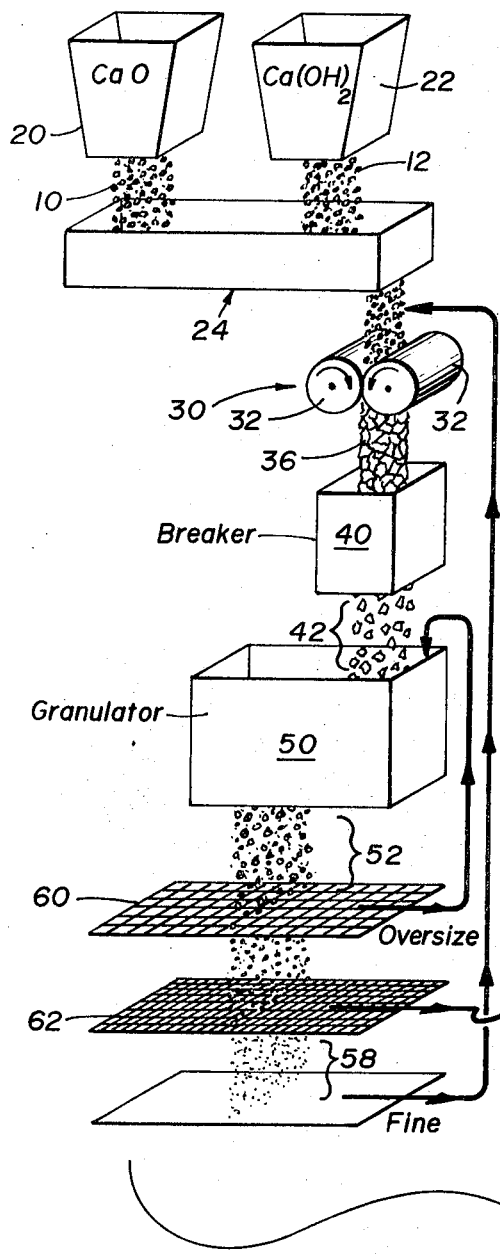
FIG. 2 is a front elevational view of the product of the invention, shown schematically as it moves through the manufacturing process of the invention.
Figure 2:
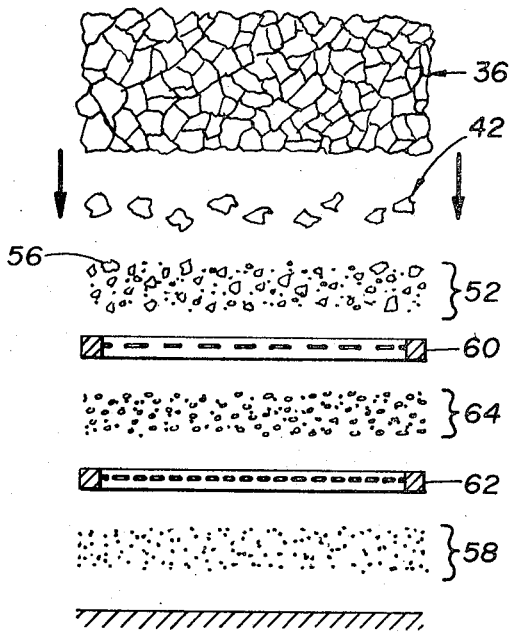

The mixture from the mixer passes into a compacting machine 30 which preferably consists of counterrotating rolls 32. The feed into the rolls could be assisted by a conventional force feeder, not shown. The pressure of the rolls is preferably at least about 12,700 pounds per linear inch, the temperature being maintained generally at room temperature, disregarding heat by friction. The force component of the force feeder, which is normal to the rolls' surface, is negligible compared to the compacting roll forces. The product leaving the compacting machine 30, FIG. 2, comprises a sheet 36 which is partially divided into segments which may be as large as 4 inches across. Thereafter, the sheet is fed into a flake breaker 40 which breaks the sheet into flakes 42 which vary in size, the smallest of which is roughly one-half inch (FIG. 2). These flakes are fed into a granulator 50 which produces granules 52 the majority of which have a thickness which does not exceed about 0.25 inches. The granules are then screened so as to separate out the oversized granules 56 having a thickness greater than about 0.25 inches, and the fines 58 which have insufficient agglomeration to prevent dusting. The oversized granules are preferably so separated by a screen 60 having a U.S. Standard mesh rating of No. 3, while the fines are preferably those which will pass through a screen 62 having a mesh size which is at least as large as No. 20 mesh. It will be appreciated that the lower limit of the size range of the product is not as critical as the upper limit, and will depend in part upon the anticipated handling of the product. This is, the more handling which occurs, the more the granules will break up into still finer sizes. If the granules start out close to the dust-producing size, the handling will tend to reduce them further to the dust size which is the very size that the agglomeration is intended to avoid. In contrast, however, the upper limit on the size is fixed by the discovery that water sprayed onto granules thicker than about 0.25 inches, and lying upon soil, for example, will not disintegrate sufficiently into the sizes necessary for soil stabilization, namely those which will pass through a No. 30 screen mesh.

The oversized granules 56 and the fines 58 can then be returned to the granulator and to the compactor, respectively.

The resultant product 64 is a granule having a variety of shapes, each of which consists essentially of CaO and $Ca(OH)_2$. It has been further discovered that, to cause the two components to intermix sufficiently and to compact in the above fashion at the pressure indicated, the amount of CaO present in the mixture fed to rollers 32 must be at least about 40 percent by weight. The product granules 64 have about the same composition as the feed mixture. The upper limit on the amount of CaO which may be used is determined not so much by the compacting step in the process, but rather by handling considerations and the intended use. As explained hereafter, that limit is preferably about 60 percent.

The following are individual examples of agglomerates which have been prepared in accordance with the above description.

EXAMPLE NO. 1

An Allis-Chalmers compacting machine designated as a 3008-A compactor mill was fed a 40 percent CaO mixture with the smooth surface rolls set for a compacting pressure of 18,750 – 26,250 lbs. per linear inch, turning at 2.5 rpm with a 0.03 inch gap. The sheet formed thereby was broken by a flake breaker into one inch, and smaller, irregularly sized flakes. These were screened so that the product was flakes sized between 3 and 8 mesh. The thickness of the flakes was less than 0.25 inch.

EXAMPLE NO. 2

A 50 percent mixture was compacted by the same machine under the same conditions except the roll pressure was 15,000 lbs. per linear inch. The flakes produced by the flake breaker were run through an Allis-Chalmers granulator machine, and the resulting granules were screened to a size between 4 and 12 mesh.

EXAMPLE NO. 3

A 50 percent mixture was fed into a Fitzpatrick compactor having the designation 9DX10L "Chilsonator." The grooved roll of this machine was operated at 10 rpm and 12,735 pounds per linear inch pressure, and produced flakes which were further reduced by a Fitzpatrick knife mill into granules. Screening produced granules sized between 3 and 20 mesh. Thicknesses were less than 0.25 inches for the majority of these granules.

A third component could be added to the CaO – $Ca(OH)_2$ combination to improve the speed of the compacting by increasing the bulk density of the mix. However, such a component would have to be inert to the disintegration process as well as the soil stabilization. An example of such a component is ground limestone.

Still other ways of continuously producing the agglomerate can be constructed. For example, the agglomerate can be formed by briquetting, wherein the counter-rotating rolls are shaped to produce briquets the thickness of which does not exceed about 0.25 inches. In such a case, the breaker and granulator apparatus can be eliminated. However, the screening could be incorporated to eliminate any defective under-sized briquets. Any fines which did not briquet would also be eliminated. Representative machinery for such briquetting includes that produced by Komarek-Greaves & Co. designated 25-CS. It was found that feeding a 50% mixture to the rolls of that machine operating with a roll pressure of 15,550 lbs. per linear inch and at 3 rpm resulted in satisfactory compacting.

SOIL STABILIZATION

As explained above, agglomerates of CaO and $Ca(OH)_2$ wherein the former is at least about 40 percent of the weight of the agglomerate will, if no thicker than about 0.25 inches, disintegrate into particles no larger than 30 mesh size, merely by the addition of water. Thus, the agglomerates are initially formed in dust-less size, and can be disintegrated, after having been spread to the stabilizing size. More specifically, it has been found that the agglomerate product has flow characteristics which make it ideal for spreading it over soil by dust-less methods. Included here are spreading by tail-gate spreaders and fertilizer spreaders. These lack the high pressure and velocity of air which tends to cause dusting in hydrated lime, and in any event the agglomerate product is already at a dust-less size. It is further anticipated that the agglomerate product can be spread by pneumatic trucks, without causing dust pollution.

Specifically, turning again to FIG. 1, the product 64 can be uniformly deposited in any of the above ways, or even by hand, upon soil 70, after which it is caused to disintegrate by spraying the deposited agglomerate with water such as from a sprayer 72. Thereafter, the disintegrated agglomerates and the soil are intermixed by any convenient apparatus, such as a rotary mixer 80. Further wetting of the mixed soild can be accomplished by additional spraying.

The amount of spraying as by sprayer 72 must be sufficient to accomplish the disintegration. It has been found that the minimum amount of water to accomplish this is that which gives a water-CaO weight ratio of at least 1, where the weight of CaO is the weight deposited on the soil to be sprayed. It is thought that the mechanism of disintegration is the slaking of the CaO in the agglomerate. In that case, the excess water present in this 1:1 ratio apparently represents that which is soaked up by the soil without affecting the CaO. Additional water can be added, and should be added such as by additional spray passes, where the soil is too dry or porous. The additional amount can be readily determined by the skilled soil worker merely by looking at the soil. In any event, the maximum usable water to CaO weight ratio is that which produces wet disintegrated agglomerates, as opposed to dry, which give the maximum soil density. It is this density which is usually desired by the construction engineers. The maximum ratio will of course be greater for more porous soils. Thus, what that ratio is in a given instance will depend upon the soil conditions, but it is thought that 3.5 is about the maximum ratio which can generally be used. It will be readily apparent that scarifying the soil prior to deposition of the agglomerate, an optional preliminary step, will be one factor which changes the porosity and therefore the amount of water to be used.

The production of wet mixed soil of desired consistency is the factor which limits the percentage amount of CaO which may be present in the agglomerate. It has been discovered that, above 60 percent CaO, the agglomerate tends to produce, even when disintegrated, a pasty soil which is difficult to work, particularly when more than a bare minimum amount of water is used in the spraying step.

The following is an example of the stabilizing process. The 50 percent mixture described as Example No. 2 was spread by a pneumatic truck on the soil base of a highway project, and water in an amount giving a 1.9 weight ratio of water to CaO was sprayed over the deposited agglomerate in a total of five passes. The agglomerate was found to disintegrate into dry hydrated lime, the presence of steam tending to indicate that slaking of the quicklime was occurring. Subsequently, the disintegrated agglomerates and soil were mixed, and the reduction in plasticity of the soil was the same as accomplished on a different portion of the test strip by a larger amount of regular hydrated lime used alone.

Although the use described has been the stabilization of soil, other uses of the agglomerate of the invention are apparent. For example, it can be used in conventional water treatment processes. An advantage in these other uses is that the percentage of CaO present lacks water and therefore is more economical to transport. The agglomerate is also more flowable and thus easier to handle. Thus, the invention is not to be limited to the particular preferred embodiments herein disclosed. Rather, it is intended to cover all alternatives, equivalent arrangements, and embodiments as may be included in the scope of the following claims.

What is claimed is:

1. A dust-less method of stabilizing soil which comprises the steps of depositing over the surface of the soil agglomerates containing $Ca(OH)_2$ and CaO, disintegrating the deposited agglomerates, and mixing the disintegrated agglomerates and the soil.

2. The method as defined in claim 1, wherein said step of disintegrating includes the step of spraying the deposited particles and soil with water in an amount sufficient to convert the CaO to $Ca(OH)_2$.

3. A process of making agglomerates consisting essentially of CaO and $Ca(OH)_2$, the process consisting essentially of the steps of
   continuously mixing and compressing particles having a size passing through a 30 mesh screen of CaO and $Ca(OH)_2$, the CaO being present in an amount of about 40 to 60 percent by weight thereof, under a pressure of at least about 12,700 lbs./linear inch at atmospheric conditions and at room temperature so as to form compacted bodies;
   and reducing the thickness of the bodies to an amount no greater than about 0.25 inches.

4. The process as defined in claim 3, wherein said reducing step includes the steps of breaking up and granulating the product produced by said compressing step.

5. The process as defined in claim 4, wherein said reducing step includes the steps of screening the granulated product and eliminating those having a thickness in excess of about 0.25 inches.

6. The process as defined in claim 3, wherein said steps of compressing and mixing include the step of rolling the particles between rolls.

7. The process as defined in claim 3, wherein said reducing step includes the steps of screening the bodies and eliminating those having a thickness in excess of 0.25 inches.

* * * * *

UNITED STATES PATENT OFFICE
CERTIFICATE OF CORRECTION

Patent No. 3,793,841             Dated 2/26/74

Inventor(s) Otto L. Dozsa

It is certified that error appears in the above-identified patent and that said Letters Patent are hereby corrected as shown below:

In Col. 1, line 27 (spec. p. 1, line 21), "handline" should read -- handling --.

In Col. 1, line 46 (spec. p. 2, line 8), "sizes" should read -- sized --.

In Col. 1, line 52 (spec. p. 2, line 12), "or" should read -- of --.

In Col. 3, line 39 (spec. p. 5, line 17), "roughtly" should read -- roughly --.

In Col. 4, line 21 (spec. p. 6, line 26), "smooth surface" should read -- smooth-surface --.

In Claim 1, line 3, "containing" should read -- consisting essentially of --; and in the same line after "CaO", insert -- said CaO being present in the agglomerates in an amount of about 40% to 60% by weight thereof, --.

Signed and sealed this 18th day of June 1974.

(SEAL)
Attest:

EDWARD M. FLETCHER, JR.
Attesting Officer

C. MARSHALL DANN
Commissioner of Patents